US006892992B2

(12) United States Patent  
Donahue

(10) Patent No.: US 6,892,992 B2
(45) Date of Patent: May 17, 2005

(54) APPARATUS, METHOD, AND SYSTEM FOR STORING A VEHICLE ACCESSORY

(76) Inventor: Lawrence A. Donahue, 1923 1st St., Perry, IA (US) 50220

( * ) Notice: Subject to any disclaimer, the term of this patent is extended or adjusted under 35 U.S.C. 154(b) by 0 days.

(21) Appl. No.: 10/100,527

(22) Filed: Mar. 18, 2002

(65) Prior Publication Data

US 2002/0153462 A1 Oct. 24, 2002

Related U.S. Application Data

(60) Provisional application No. 60/276,969, filed on Mar. 19, 2001.

(51) Int. Cl.⁷ ................................................. A47F 5/00
(52) U.S. Cl. ............... 248/201; 248/231.9; 248/221.11; 296/77.1; 296/78.1; 211/87.01; 211/18; 211/41.14
(58) Field of Search ............................. 248/207, 218.4, 248/220.21, 223.31, 231.91, 201, 221.11, 222.52, 316.8, 475.1, 496, 221.1, 220.1; 211/5, 17, 18, 41.14, 105.1, 87.01; 296/78.1, 77.1

(56) References Cited

U.S. PATENT DOCUMENTS 4,938,442 A * 7/1990 Mastrodicasa .............. 248/250
5,236,242 A * 8/1993 Seeman .................... 296/180.1
5,427,425 A * 6/1995 Droesch ....................... 296/50
5,465,883 A * 11/1995 Woodward .................. 224/495
5,558,260 A * 9/1996 Reichert ..................... 224/413
5,655,740 A * 8/1997 Lazarus ...................... 248/243
5,658,035 A * 8/1997 Armstrong .................. 296/78.1
5,667,232 A * 9/1997 Gogan et al. ............... 280/202
5,732,965 A * 3/1998 Willey ...................... 280/288.4
5,853,217 A   12/1998 Armstrong
6,053,384 A * 4/2000 Bachman .................... 224/430
6,196,614 B1 * 3/2001 Willey ....................... 296/78.1
6,254,166 B1 * 7/2001 Willey ....................... 296/78.1
6,513,776 B1 * 2/2003 Bissett ...................... 248/309.1
2003/0218109 A1 * 11/2003 Farnham ................... 248/205.1

* cited by examiner

Primary Examiner—Kimberly Wood
(74) Attorney, Agent, or Firm—McKee, Voorhees & Sease, P.L.C.

(57) ABSTRACT

An apparatus, method, and system for storing a vehicle accessory, for example on a wall, that utilizes an attachment structure which simulates at least part of the attachment structure to which the motor vehicle accessory attaches to a vehicle, so that the same attachment structure used to attach the accessory to the vehicle is used, at least, in part to store on a wall or other supporting structure.

11 Claims, 7 Drawing Sheets

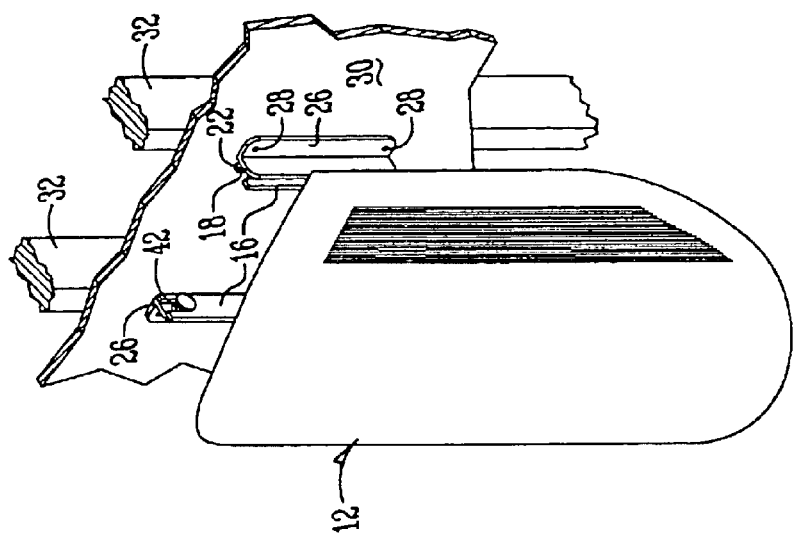
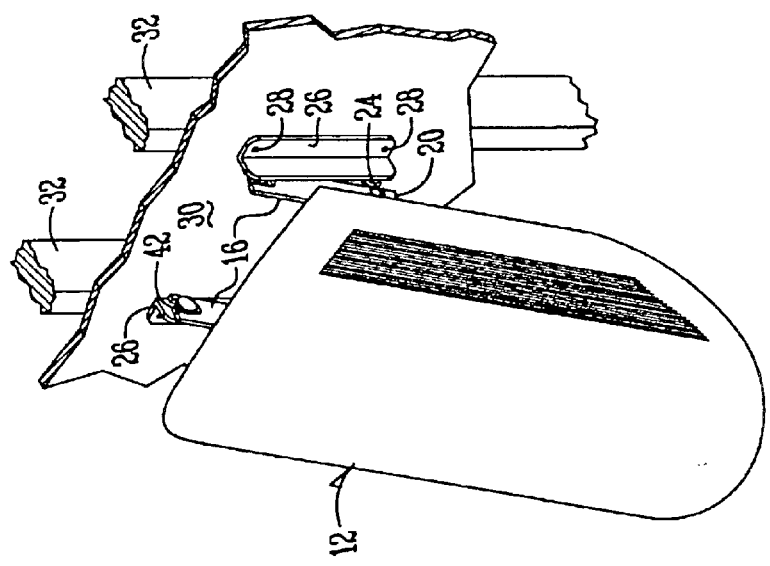
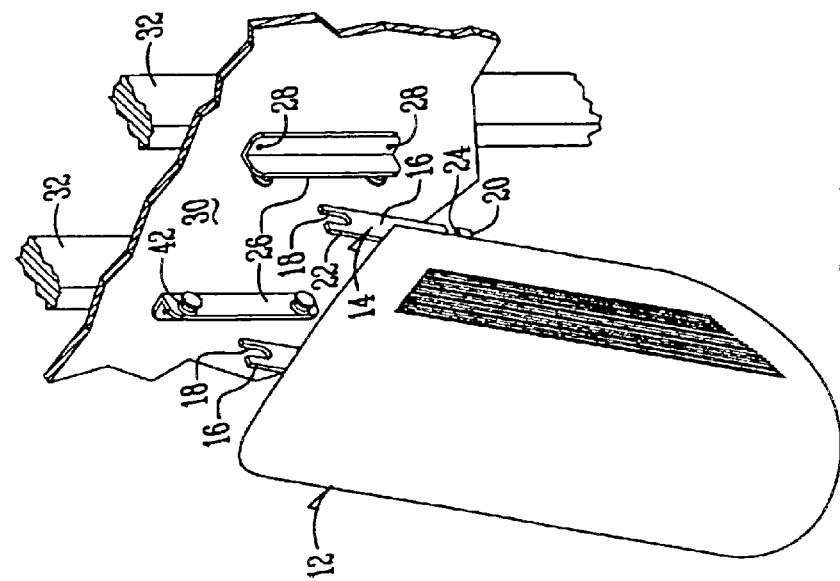
Fig. 4
Fig. 5
Fig. 6

APPARATUS, METHOD, AND SYSTEM FOR STORING A VEHICLE ACCESSORY

CROSS-REFERENCE TO RELATED APPLICATION

This application claims the benefit of U.S. Provisional Application Ser. No. 60/276,969 filed Mar. 19, 2001.

BACKGROUND OF THE INVENTION

1. Field of the Invention

This invention relates to an apparatus, method, and system for storing a vehicle accessory and, in particular, brackets or a hanger for the same.

2. Problems in the Art

Vehicles such as cars, trucks, and motorcycles, can have a variety of accessories. Some are permanently affixed to the vehicle; others are removable.

Some accessories are relatively large, e.g. several feet in at least one dimension. If removable, they take up considerable storage space. They can be cumbersome to manually handle. When separated from the vehicle, and stored in an unsecured place or manner, there is a danger of damage to the accessory.

One example is a motorcycle windshield or windscreen. Some are intentionally made to be easily detachable so that the owner can, depending on desire, attach or detach the windscreen without much effort and quickly. Some systems allow quick removal without the need for tools. If the operator decides to ride the motorcycle without the windscreen, it can be quickly taken off. On the other hand, when desired it can be quickly mounted for operative use.

Motorcycle windscreens need to be substantially transparent but also have substantial strength and durability. They are typically made of glass or plastic, e.g. Plexiglas. Although they come in a variety of sizes, some are of substantial size (several feet by several feet in perimeter dimension) to present a substantial area of wind blockage for the vehicle operator. They tend to be of odd or non-regular shapes, which make them cumbersome to handle and store.

The nature of the materials generally used for windshields can present special storage problems. Even leaned against a wall or placed on a shelf, there is a risk of scratching the windshield by abrasion while placing or removing the windshield into such a stored position, or by some other object coming into contact with it. Some windshields are at risk of deformation (particularly plastics) or other damage, if forces or pressure are exerted against them while stored. Glass would be at risk of cracking or breakage. Consequently, there is a real need for not only protecting such a windshield from scratches, but also from deformation or damage, even if leaned against a wall or other structure.

Some windshields are made of Lexan®. Harley-Davidson, in its "FLT 2000 Owner's Manual", recognizes that its Lexan® windshields are advantageous because of durability and distortion-resistant material compared to other types of motorcycle windshield material, but that even Lexan® requires attention to maintain. Scratches are a particular problem.

One example of a removable motorcycle windscreen can be seen at U.S. Pat. No. 5,853,217, which is incorporated by reference in its entirety herein. It discloses a particular method of releasable mounting of the windscreen, utilizing two vertically separated, outwardly extending bosses on opposite sides of the motorcycle onto which can be mounted corresponding sets of sockets or receivers on opposite sides of the windshield. In this particular example, a lower end of the windshield has a set of lower sockets. To the install the windshield, the lower end of the windshield is manipulated such that the lower sockets are installed over a pair of lower bosses on the motorcycle. The windshield is then tilted around a rotational axis defined by the lower pair of bosses until an upper pair of sockets mate with the upper pair of bosses on the motorcycle. A locking mechanism can lock the windshield in place. The locking mechanism is easily, manually operated so that the windshield can be quickly and easily taken on or off.

The U.S. Pat. No. 5,853,217 patent does not address storage of the windshield once it is taken off the motorcycle. But, presently, one method of trying to protect such windshields teaches placing the windshield into a bag to protect the windshield from scratches (see. e.g., Harley-Davidson "windshield storage bag currently available from Harley-Davidson). Not only is it cumbersome to take such a windshield and insert it into a bag, the bag represents a somewhat costly additional component. It also does not address risk of damage by blunt forces or deformation by forces against the windshield while stored in the bag. It also does not address the issue of how to store the windshield in a safe, out-of-the-way manner, or to minimize potential damage to it.

Thus, there is a real need in the art for an improved way of storing removable motorcycle windshields. Similar problems and needs exist for other accessories for motor vehicles. For example, such needs exist for other motor vehicle accessories of substantial size that have their own separate mounting or attachment structure to corresponding mounting or attachment structure on the vehicle.

BRIEF SUMMARY OF OBJECTS AND FEATURES OF THE INVENTION

It is therefore the principal object of the present invention to provide an apparatus, method, and system for storing motor vehicle accessories, which improves over the state of the art. It is a further object, feature, or advantage of the present invention to provide an apparatus, method, or system as described above, which:

a. is economical;
b. is durable;
c. is efficient;
d. is less cumbersome to effectuate storage of the accessory and to retrieve it from storage;
e. is highly flexible as far as positioning of the stored accessory;
f. helps deter damage to the accessory while stored;
g. can be advantageously used to promote efficient use of storage space;
h. can simulate the attachment structure on the vehicle;
i. can promote a less cumbersome storage.

These and other objects, features and advantages of present invention will become more apparent with reference to the accompanying specification and claims.

In one aspect of the invention, a bracket is mountable to a support structure, such as a wall. An attachment structure on the bracket simulates at least some of the attachment structure on the vehicle designed to allow releasable mounting of the vehicle accessory to the vehicle. In this manner, at least some of the same attachment structure used to mount the vehicle accessory to the vehicle is used to mount the vehicle accessory in a storage position.

BRIEF DESCRIPTION OF THE DRAWINGS

FIG. 4 is a reduced in size view similar to FIG. 1, but including a vehicle accessory, here a motorcycle windshield, shown in a preparatory position for attachment to the mounting brackets of FIG. 1.

FIG. 5 is similar to FIG. 4, but shows the windshield in an intermediate stage of attachment to the mounting bracket of FIG. 1.

FIG. 6 is similar to FIG. 5, but shows the windshield in a final mounted position on the mounting brackets of FIG. 1.

DETAILED DESCRIPTION OF A PREFERRED EMBODIMENT ACCORDING TO THE INVENTION

Figure 1:
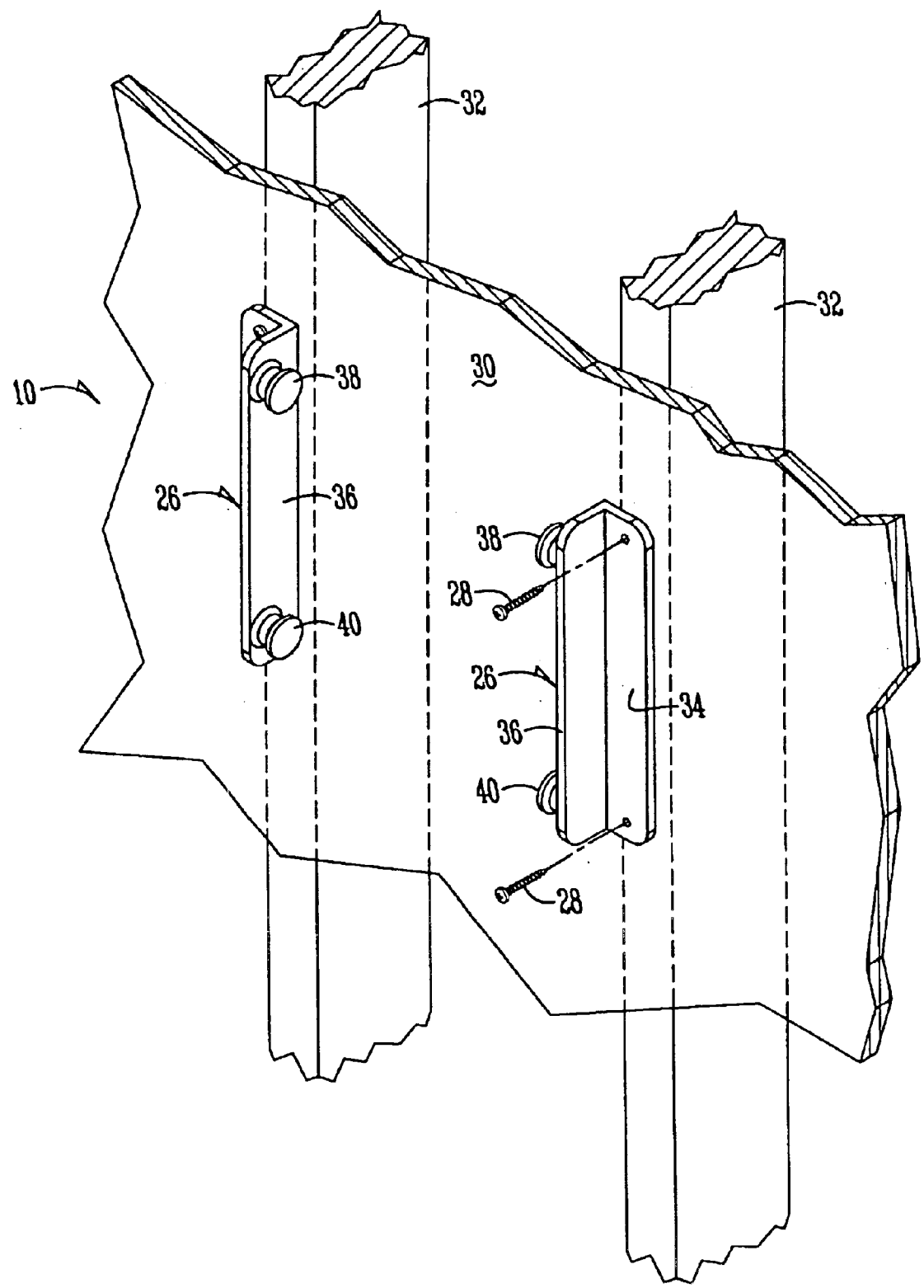
FIG. 1 is a perspective view of mounting brackets according to a preferred embodiment of the present invention shown installed on a wall, with the wall and supporting vertical studs shown in a fragmented manner.
Figure 2:
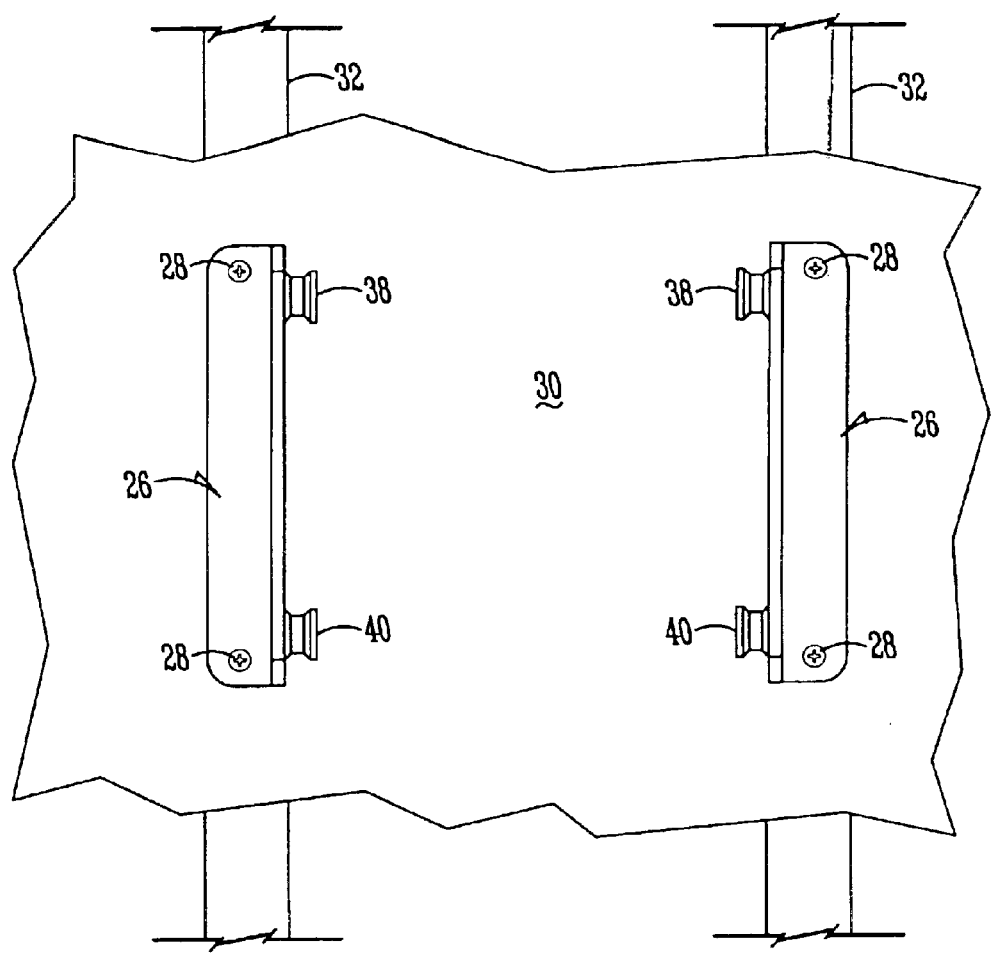
FIG. 2 is a front elevation view of FIG. 1.
Figure 3:
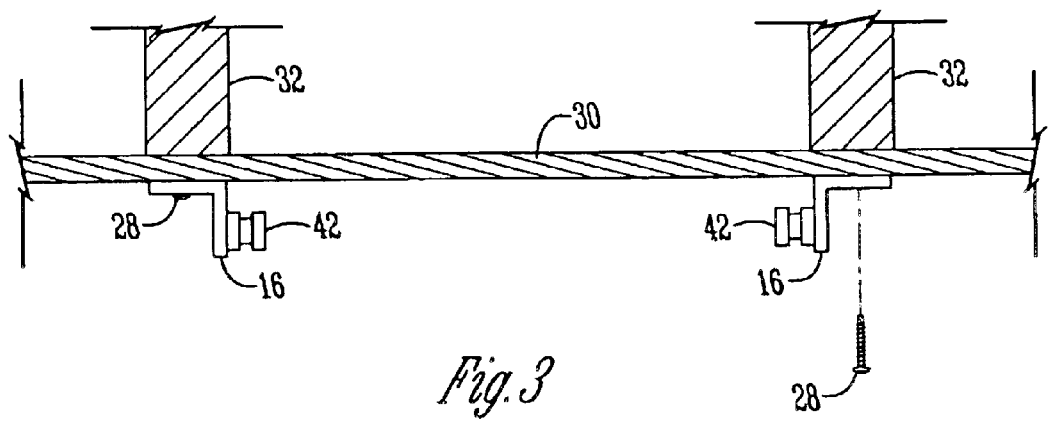
FIG. 3 is a top plan view of FIG. 1.

For an improved understanding of the invention, one example or embodiment the invention can take will now be described in substantial detail. Frequent reference will be taken to the appended drawings. References numerals will be used to indicate certain parts or locations in the drawings. The same reference numerals or letters will be used to indicate the same parts and locations throughout the drawings unless otherwise indicated.

In this exemplary embodiment, a storage system for a vehicle accessory is described where the vehicle accessory is a motorcycle windshield of the type disclosed is U.S. Pat. No. 5,853,217. The windshield will be generally referred to as windshield 12, which includes the transparent actual windscreen as well as its supporting and attachment structure. Windshield 12 includes attachment structure (generally referred to at reference numeral 14) that in this instance comprises two brackets 16 each extending in generally parallel planes from opposite lateral sides of windshield 12. Each bracket 16 includes a lower socket 18 and upper socket 20 existing in the plane of the bracket 16. Lower socket 18 is a U-shaped slot or recess at the bottom of bracket 16, having an open end 22. Upper socket 20 is also U-shaped with an open end 24. Note that sockets 18 and 20 are oriented in different directions, here generally perpendicular relative to one another (See FIG. 4).

Brackets 16, a part of windshield 12, allow windshield 12 to be quickly and easily manually installed upon corresponding bosses on a motorcycle. This is explained in detail in U.S. Pat. No. 5,853,217, incorporated by reference herein. Further detail can be found in that patent and will not be repeated herein. As set forth in U.S. Pat. No. 5,853,217, locking or latching structure, manually operable, can be included on windshield 12 to releasably lock windshield on a motorcycle. But also, elastomeric members can be positioned over or be a part of the bosses to assist in holding windshield 12 to the bosses, as explained in U.S. Pat. No. 5,853,217.

FIGS. 1–6 illustrate a hanger or storage system 10 according to an embodiment of the present invention. Mirror image brackets 26 are mounted by lag bolts or screws 28 to a supporting structure such as an interior or exterior wall 30 of a building (e.g. garage). Here brackets 26 are shown mounted not only to wall 30, but to vertical studs 32 behind wall 30. Whether or not the wall studs can be used for additional support will depend upon several things, including the size of the vehicle accessory, and the size of the brackets, as will be further discussed below.

Brackets 26 have a general L-shape cross-section, including a mounting plate 34 and an outward extending boss plate 36. Each bracket 26 has first and second bosses 38 and 40 at spaced apart locations along the side of extending plate 36 away from mounting plate 34. Bosses 38 and 40 are similar or the same in form and function to the bosses on motorcycles for which the sockets of windshield 12 are designed to attach. This allows brackets 16 of windshield 12 to utilize bosses 38 and 40 in the manner shown in FIG. 4–6. Bosses 38 and 40 are sized such that lower and upper sockets 18 and 20 mount over them (bosses 38 and 40 fit within sockets 18 and 20).

Also shown FIGS. 1–6, when operatively installed on wall 30, brackets 26 must be spaced apart the same distance and in the same orientation relative to sockets 18 and 20 as bosses on a motorcycle designed to work with brackets 16 of windshield 12 would be spaced and oriented. Ideally, the user of brackets 26 would be given precise wall-mounting instructions regarding spacing and orientation between left and right brackets 26 to assist in precise installation of brackets 26 on wall 20 (the instructions could even include a template to assist the user to mark the correct locations).

As can be understood, because brackets 26 are separate members, they must be installed on wall 30 accurately. In the case of windshield 12, its size is conducive to manufacturing brackets so that when brackets 26 are correctly spaced apart to receive windshield 12, mounting plates 34 are aligned for attachment to standardly spaced wall studs. The width of mounting plates 34 is pre-designed to align with 16 inch-on-center vertical wall studs 32. For different sized vehicle accessories, the width or configuration of mounting plates 34 could be changed to align with the wall studs, if desired. But, on the other hand, brackets 26 do not need to be mounted to studs and they may not.

As shown in FIGS. 4–6, windshield 12 can be releasably mounted to hanger system 10 by inverting windshield 12 from its normal operating orientation (with brackets 16 pointing down) and directing what are normally the lower sockets 18 of brackets 16 towards first bosses 38 on brackets 26 in the manner shown in FIG. 4. Once lower sockets 18 are moved angularly upwardly such that first bosses 38 are seated therein (FIG. 5), windshield 12 is pivoted down around a pivot axis defined by bosses 38 such that the remainder of windshield 12 is swung towards wall 30 until the upper sockets 20 in brackets 16 move to second bosses 40 of brackets 26 and second bosses 40 are seated within sockets 20 (FIG. 6). The perpendicular offset of sockets 18 & 20 function to hold windshield 12 in place on brackets 26. Sockets 20 and bosses 40 prevent upward or downward or wallward movement of windshield 12. Sockets 18 and bosses 38 prevent upward, forward, or wallward movement. Windshield 12 is thus easily attached to brackets 26 along wall 30.

As can be appreciated, windshield 12 can be manually removed quickly and easily from brackets 26 by reversing the process described above regarding FIGS. 4–6. The user grabs windshield 12 and pivots it from the position in FIG. 6 to the position in FIG. 5, releasing upper sockets 20 from second bosses 40. Windshield 12 is then lowered to release lower sockets 18 from first bosses 38. The windshield 12 is rotated to an upright position (with lower sockets 18 facing downward), with the convex side of windshield 12 facing forwardly of the motorcycle, and windshield 12 can be installed on bosses on the motorcycle as described in U.S. Pat. No. 5,853,217.

As can bee seen, brackets 26 of hanger system 10 simulate or are the functional equivalent of the bosses on the motorcycle such that the same attachment structure of windshield 12 used to mount windshield 12 to a motorcycle (here sockets 18 and 20 of brackets 16) are used to mount and store the windshield 12 on a wall.

As can be further appreciated, to maximize storage space and to try to remove the windshield 12 from risk of damage, brackets 26 can be placed relatively high on the wall 30 (e.g. six or more feet high). It is preferable, of course, that the mounting height of brackets 26 be such that the user can install the windshield 12 to brackets 26 in while standing on the floor (without having to use a step stool or ladder), but nonetheless, by placing brackets 26 relatively high on the wall, windshield 12 can be stored up and away in a room or garage, to reduce the risk of damage and to optimize use of space in the room.

However, in some situations it might be desirable to mount windshield 12 in a lower position. For example, brackets 26 can be placed three to five feet off the floor, either interiorly or exteriorly of a building. One use of such a configuration for hanger system 10 would be to mount windshield 12 for maintenance. For example, it could be advantageously used to mount windshield 12 relatively low off of the ground and be able to clean or spray windshield 12, such as to remove bugs or road debris, without having to support the windshield with one's hands.

As can be further understood, it is not necessarily required that windshield 12 be installed on brackets 26 in an inverted position. It could also be installed in an upright or normal position (lower sockets 18 down). Also, it is not necessary that brackets 26 be vertically mounted on supporting structure. They could be angularly or horizontally mounted such that bosses 38 and 40 are non-vertical relative to each other. They also could be installed on other than a vertical wall (e.g. on a horizontal or non-vertical surface, or to some other support).

Figure 7:
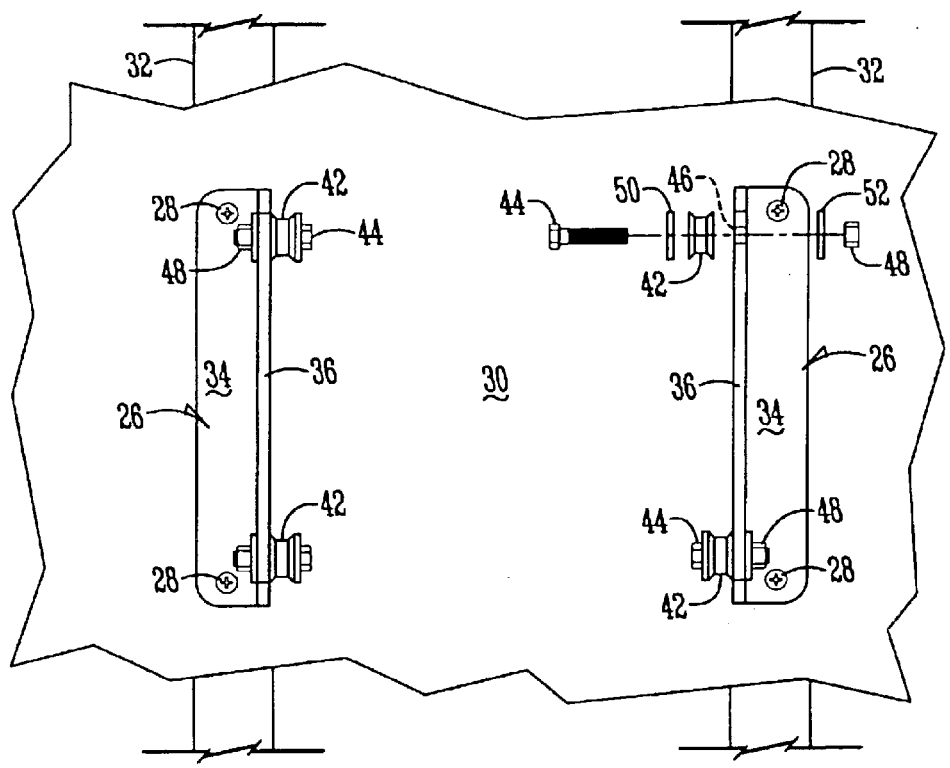
FIG. 7 is similar to FIG. 2, but shows more detail of the embodiment of the mounting brackets of FIG. 2, including in exploded form the simulated boss adapted for mounting of the windshield of FIGS. 4–6.

FIGS. 7–10 illustrate with more detail an embodiment for brackets 26. As shown in FIG. 7, first bosses 38 or second bosses 40 can be constructed as follows. A grommet 42 can be mounted to a bracket 26 by extending a bolt 44 into grommet 42 and through an opening 46 in outwardly extending plate 36 of bracket 26. A nut 48 can secure bolt 44 and grommet 42 in place. Washers 50 and 52 can be used as shown.

Bolt 44 would therefore comprise a strong rigid boss and would have an outside diameter that would slide within lower sockets 18 or upper sockets 20. Grommet 42 can be somewhat elastic or elastomeric and could have an outside diameter larger than the width of lower sockets 18 or upper sockets 20. Thus, when gromet 42 is forced into a lower socket 18 or upper socket 20, would compress and, by friction and its elastomeric or resilient nature, would resist movement of bracket 16 out away from it.

Figure 8:
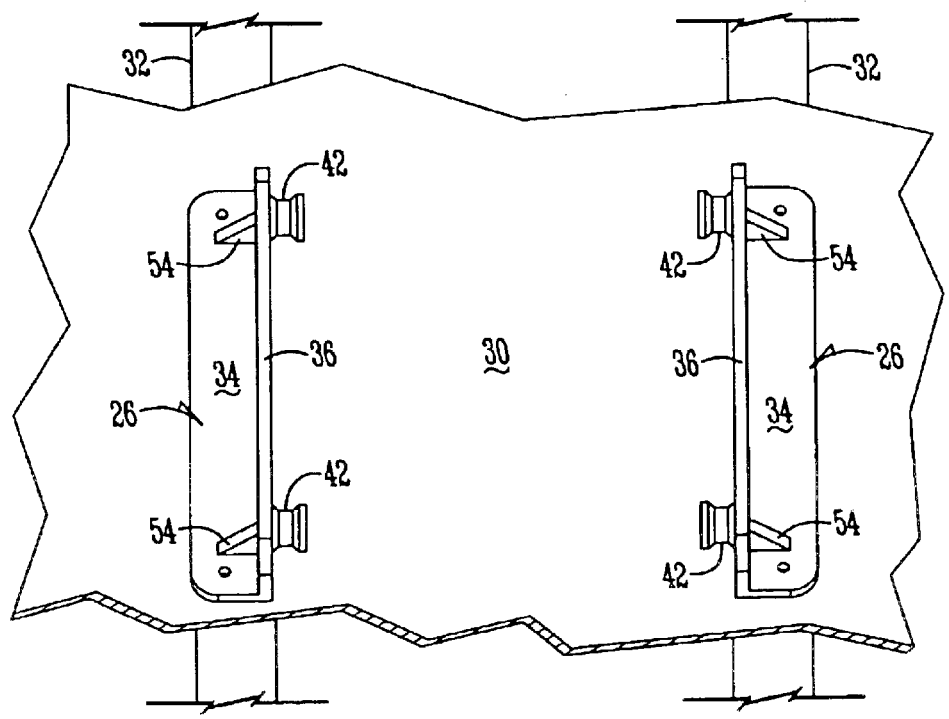
FIG. 8 is similar to FIG. 2 showing an alternative embodiment of mounting brackets.

FIG. 8 illustrates that optionally strengthening or supporting ribs 54 could be added between mounting plates 34 and extending plates 36. Also, edges of mounting plates 34 and extending plates 36 could be rounded to reduce the likelihood of interference, damage, or catching of the windshield when being attached or detached.

Figure 9:
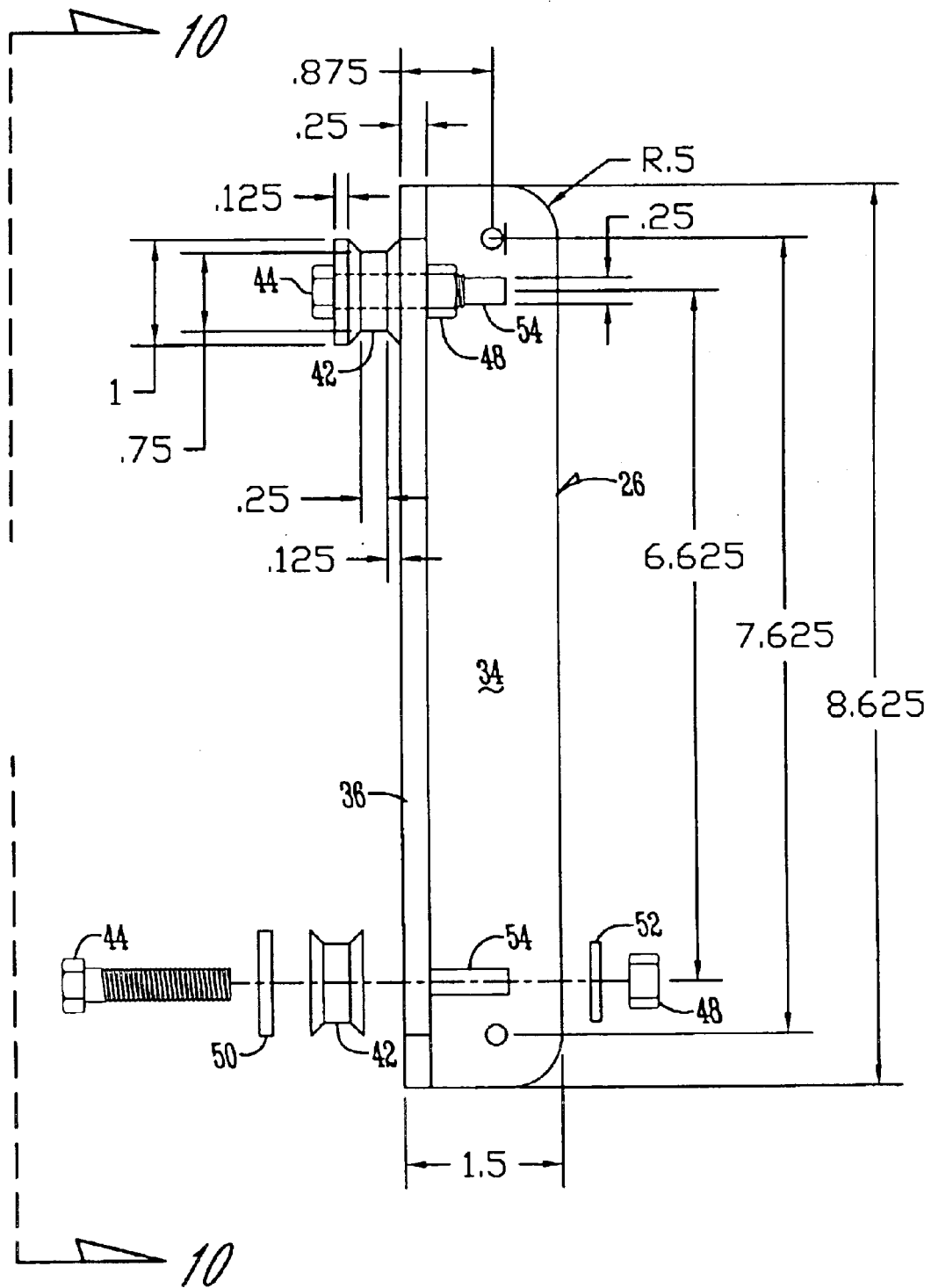
FIG. 9 is a plan view of one of the mounting brackets of FIG. 8 showing certain dimensions of the single bracket.

FIG. 9 illustrates dimensions of bracket 26 as shown in FIG. 8 as could be used with windshield 12 of the type disclosed in U.S. Pat. No. 5,853,217.

Figure 10:
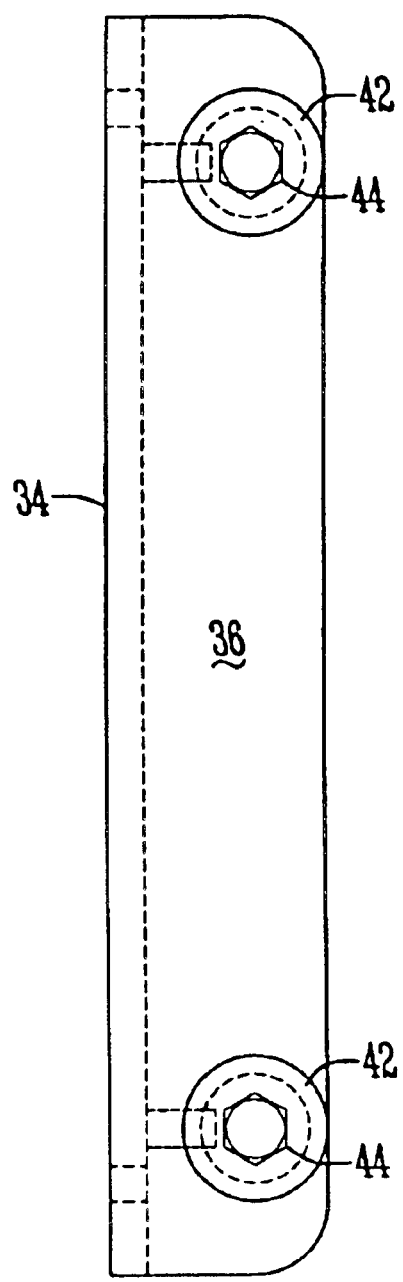
FIG. 10 is a plan view taken along line 10—10 of FIG. 9.

FIG. 10 illustrates a different view of such bracket 26.

Figure 11:
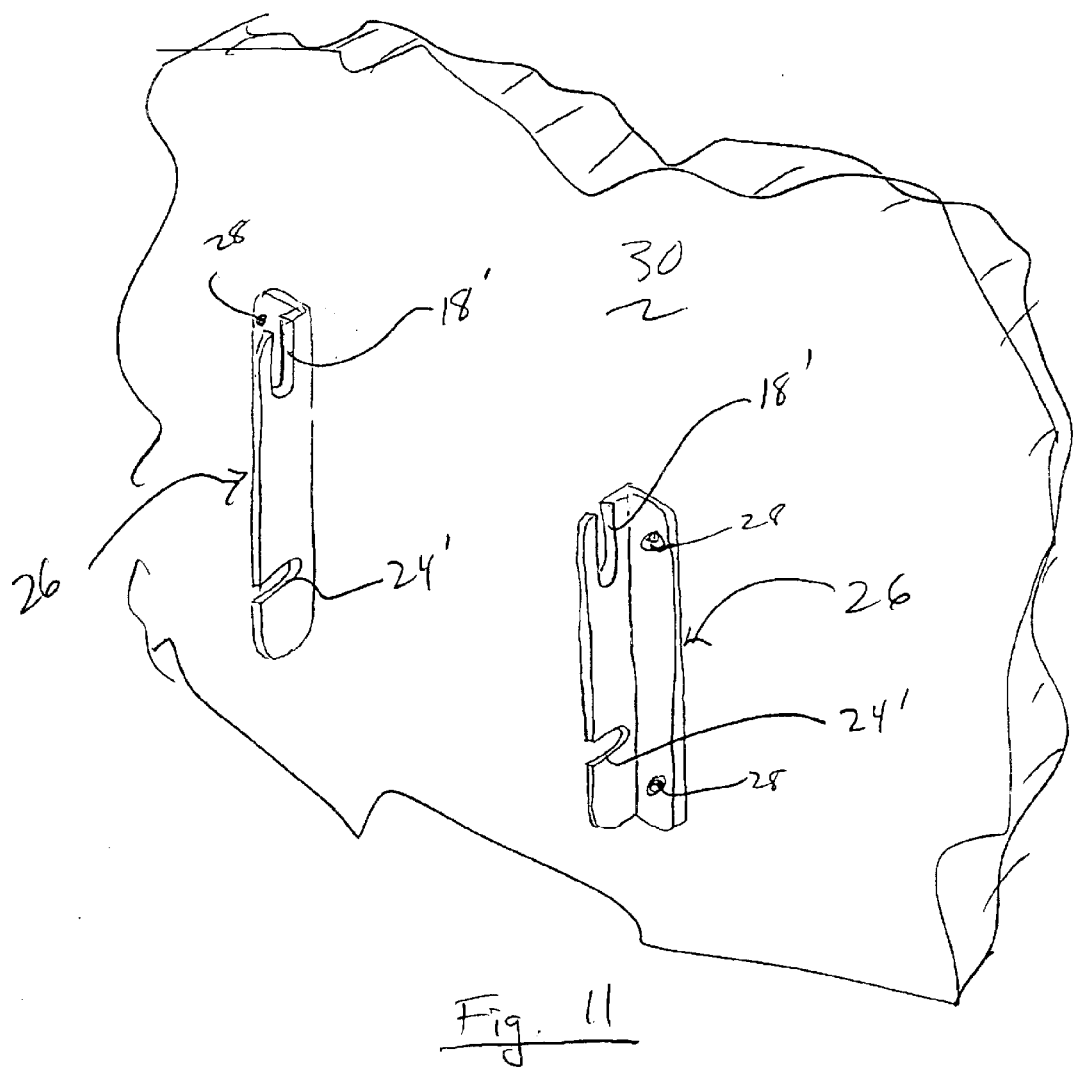
FIG. 11 is a view similar to FIG. 1 showing an alternative embodiment for brackets 26.

FIG. 11 illustrates an alternative to brackets 26 of FIG. 1. If the accessory has male mounting members (e.g. bosses), brackets 26 could have slots or sockets to receive the same and mount the accessory to wall 30.

It can therefore been seen that hanger system 10 is comprised of two relatively small sized brackets 26 that can be selectably mounted in a desired position and mimic or simulate the attachment structure for windshield 12 to provide for mounting a windshield 12 in a stored position. The Figures illustrate the principle of simulating at least some of the attachment structure of a vehicle for a removable accessory to take advantage of that pre-designed attachment structure and use it advantageously as a method hanging or mounting the vehicle accessory for storage.

Options and Alternatives

The included preferred embodiment is given by way of example only and not by way of limitation to the invention which is solely described by the claims herein. Variations obvious to one skilled in the art will be included within the invention defined by the claims.

The present invention can take many forms and embodiments. The true essence and spirit of this invention are defined in the claims and it is not intended that the embodiment of the invention presented herein should limit the scope thereof.

For example, brackets 26 could be made of angle iron metal material, utilizing metal bolts 44 and elastomeric grommets 42. Alternatively, brackets 26 might be made of molded one-piece plastic of the type having sufficient strength and durability to support a vehicle accessory. A windshield 12 can weigh from ounces to several tens of pounds. Brackets 26 could be made, as is within the skill of those skilled in the art, to accommodate the same.

Brackets 26 are shown in the Figures as two separate mirror-image brackets. The user would be sure to install them at a spaced apart distance that is appropriate for brackets 16 of windshield 12.

The embodiment in the Figures utilizes brackets that each have two spaced-apart sockets, one generally perpendicular to the other. There could be more or less sockets. The sockets could be in a variety of configurations, including a variety of orientations relative to one another. For example, a different socket arrangement is known for another motorcycle windshield where sockets 18 and 20 on brackets 16 are generally parallel to one another. They are also oblique to horizontal or vertical when the windshield is mounted on the motorcycle. This embodiment allows mounting onto the motorcycle by moving the windshield brackets 16 obliquely such that all four bosses seat into sockets 18 and 20 simultaneously. Brackets like brackets 26 could be used to store this windshield, with four bosses 38 and 40 simulating bosses on the motorcycle, though this embodiment would need to be stored on brackets 26 in an upright (not inverted position) to stay on brackets 26 (because of the parallel, oblique slots).

Thus, the design of hanger system 10 will depend primarily on the attachment structure on the vehicle accessory and the corresponding attachment structure on the vehicle. It is not necessarily limited to a socket/boss arrangement. As can be appreciated, other types of attachment structure 14 for a vehicle accessory allow releasably mounting to the vehicle and which can be simulated on brackets or other corresponding attachment structure that can be attached to supporting structure such as a wall. Brackets 26 could take on different forms and configurations. Still further, brackets 26 are shown in the drawings as two separate pieces, but they could be part of a single integrated hanger system 10 instead of two separate pieces. A variety of types of latching or securing structure could be used to provide additional assurance against the vehicle accessory separating or becoming lose on the hanger system 10, if desired.

Still further, it is not required that hanger system 10 simulate all of the attachment structure of the vehicle accessory. There maybe situations where only part of that attachment structure needs to be simulated on the hanger system 10 to facilitate storage.

Another option that has applicability to windshield 12 would be to include some type of bag or cover that could be placed over windshield 12, yet allow exposure of bracket 16 for mounting to brackets 26. It is believed that this could be accomplished even with existing on-the-market bags used for such windshields 12.

Again, the exemplary embodiment shown and described relative to the Figures illustrates the principal of simulating at least of part of the attachment structure on a vehicle and utilizing the corresponding attachment structure (or at least part of it) as the way to store a vehicle accessory. This concept can be applied to other vehicle accessories having a similar or analogous attachment structure concept.

What is claimed is:

1. In combination a pair of brackets each having an attachment structure and adapted for storing a removable motorcycle windshield on a support structure off of a motorcycle and the motorcycle windshield having a pair of spaced apart mounts each having an attachment structure adapted for releasable attachment to the motorcycle by the attachment structure on the motorcycle windshield, which releasably attaches to corresponding attachment structure on the motorcycle, comprising:
    (a) the attachment structure on each mount of the motorcycle windshield comprising female receivers each having an open end with a width and a length;
    (b) the attachment structure on each bracket, which simulates corresponding attachment structure on the motorcycle, comprising male members each having a diameter less than or equal in width to the socket;
    (c) the attachment structure on the motorcycle windshield further comprising a pair of separated said sockets along an axis with open ends facing an attachment direction; and the attachment structure on the bracket further comprising a pair of bosses aligned along an axis wherein attachment of the bosses through the open ends of the sockets is allowed when the motorcycle windshield is attached to the bracket;
    (d) so that the motorcycle windshield can be removably stored off the motorcycle onto the support structure by releasable attachment to the brackets using the attachment structure of each bracket instead of the attachment structure on the motorcycle.

2. The apparatus of claim 1 wherein the attachment structure on the windshield and on the motorcycle comprises cooperating elements that when operatively connected restrain movement of the windshield relative to the motorcycle in at least one direction.

3. The apparatus of claim 2 wherein the restraint of movement is in at least two directions.

4. The apparatus of claim 2 wherein restraint of movement of the attachment structure on the motorcycle or the windshield includes a releasable locking mechanism.

5. The apparatus of claim 1 wherein the sockets of the pair of separated sockets having open ends facing different directions.

6. The apparatus of claim 5 wherein the different directions are generally perpendicular.

7. A method of storing off of a motorcycle a removable motorcycle windshield which is releasably attachable to the motorcycle by a pair of spaced apart mounts each having attachment structure that releasably attaches to corresponding attachment structure on the motorcycle the attachment structure on the windshield comprising female receivers each having an open end with a width and length, comprising:
    (a) simulating at least some of the attachment structure of the motorcycle on a pair of brackets adapted for mounting to a supporting structure apart from the motorcycle, the attachment structure comprising male members each having a diameter less than or equal in width to the socket;
    (b) the attachment structure on the motorcycle windshield further comprising a pair of separated said sockets along an axis with open ends facing an attachment direction; and the attachment structure on the bracket further comprising a pair of bosses aligned along an axis, wherein attachment of the bosses through the open ends of the sockets is allowed when the motorcycle windshield is attached to the bracket;
    (c) storing the motorcycle windshield apart from the motorcycle by utilizing at least some of its attachment structure to attach to the simulated attachment structure of the brackets.

8. The method of claim 7 wherein the motorcycle windshield is several feet by several feet in perimeter dimension.

9. The method of claim 7 wherein the motorcycle windshield has a pair of sockets each oriented in different directions and adapted to receive a boss.

10. The apparatus of claim 1 wherein the support structure comprises a wall of a building.

11. The apparatus of claim 1 further comprising a second pair of separated sockets adapted to cooperate with a second set of bosses.

* * * * *